(No Model.)
J. HEALY.
HAND HOOK.
No. 435,420. Patented Sept. 2, 1890.
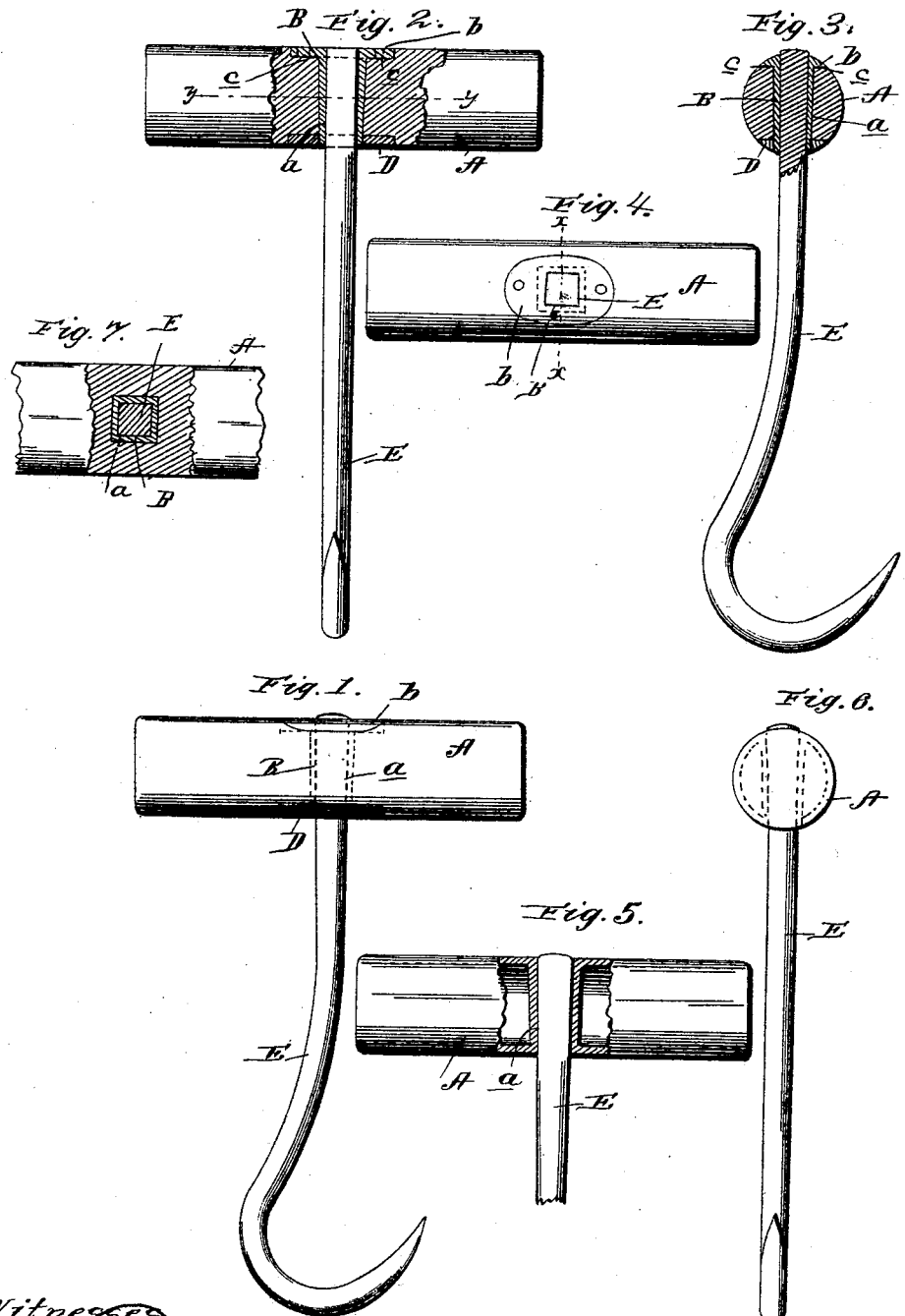

UNITED STATES PATENT OFFICE.

JAMES HEALY, OF BROOKLYN, NEW YORK.

HAND-HOOK.

SPECIFICATION forming part of Letters Patent No. 435,420, dated September 2, 1890.

Application filed December 30, 1889. Serial No. 335,448. (No model.)

*To all whom it may concern:*

Be it known that I, JAMES HEALY, a citizen of the United States, residing at Brooklyn, in the county of Kings and State of New York, have invented certain new and useful Improvements in Hand-Hooks; and I do declare the following to be a full, clear, and exact description of the invention, such as will enable others skilled in the art to which it appertains to make and use the same.

This invention relates to an improvement in hand-hooks such as used in handling general merchandise and particularly in loading and unloading vessels and steamers; and the novelty will be fully understood from the following description and claim, when taken in connection with the annexed drawings, in which—

Figure 1 is a side elevation of my improved device, showing the hook directed in the same plane as the handle. Fig. 2 is a view of the same, showing the hook in a plane relatively at right angles to that shown in Fig. 1, and also showing the handle and socket in section. Fig. 3 is a vertical sectional view taken on the line $x\ x$ of Fig. 4. Fig. 4 is a plan view of the handle and hook in position. Fig. 5 is a side view, partly in section, of a modification; and Fig. 6 is an end view of the latter. Fig. 7 is a sectional view of the socket-handle and shank of the hook, taken at the point indicated by the dotted line $y\ y$ on Fig. 2.

Referring by letter to said drawings, A indicates a handle, which is formed of wood or other suitable material in a size for the convenient grasp of a man's hand. This handle is provided midway of its length with a transverse aperture or hole $a$, which should taper from one end to the other, and is of rectangular or polygonal form in cross-section with straight walls.

B indicates a metallic socket, which also tapers lengthwise, and is of a form in cross-section corresponding with the shape of the hole $a$. The socket B is provided at its upper end with a flange $b$, which is let into a recess $c$ formed in the handle around the hole $a$, and the said flange is preferably provided with apertures to receive screws or other suitable fastening devices.

D indicates a washer, which is also let into a recess in the under side of the handle and over the lower end of the socket, where it may be secured in a manner similar to the flange $b$. As thus constructed, I have a handle with a socket fixed therein and the inner angular walls of the latter tapering from above downwardly.

E indicates the hook or rod having its lower end terminating in a hook, as shown. This rod, which is preferably formed from steel, has a sufficient portion of its upper end flattened or made rectangular in cross-section, and the balance of the rod is of a circular form in cross-section.

The socket B, which is arranged in the handle, is of a rectangular form in cross-section. By this construction it will be seen that when it is desirable to change the direction of the hook with relation to the handle, it is simply necessary to force the handle down upon the rounded portion of the rod, so as to permit said handle to turn upon the rounded portion of the handle. After the hook has been turned in the desired direction the handle is drawn up over the square portion of the rod, where it will be held by frictional contact, and be prevented from drawing off by reason of said rod being slightly tapering.

When it is desirable to change the direction of the hook with respect to the handle, it is simply necessary to loosen the rod in the socket and move the former outwardly to turn it around when it may be again drawn into the socket, where it will be held by frictional contact, and any draft brought on the hook will tend to secure the two more firmly together.

By special reference to Figs. 5 and 6 of the drawings, it will be seen that the handle is made hollow, and in such case it should be made of metal or the like, and the socket, which is of a form the same as the socket in the wooden handle, is formed integral with the handle proper.

Having described my invention, what I claim is—

A hand-hook comprising the handle A, having the hole $a$ transversely therein, the rectangular metallic socket B, arranged in said hole and having the flange $b$ at one end and the flange D at its opposite end, and the round rod having the hook turned on one end and its opposite end rectangular and slightly tapered where it enters the socket, substantially as specified.

JAMES HEALY.

Witnesses:
L. EXTER MEER,
IRA A. KIMBALL.